United States Patent
Ochiai et al.

(10) Patent No.: US 11,016,868 B2
(45) Date of Patent: May 25, 2021

(54) APPLICATION USAGE ESTIMATION DEVICE AND RULE FORMULATION DEVICE

(71) Applicant: NTT DOCOMO, INC., Chiyoda-ku (JP)

(72) Inventors: Keiichi Ochiai, Chiyoda-ku (JP); Yusuke Fukazawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/347,654

(22) PCT Filed: Apr. 10, 2018

(86) PCT No.: PCT/JP2018/015102
§ 371 (c)(1),
(2) Date: May 6, 2019

(87) PCT Pub. No.: WO2018/190341
PCT Pub. Date: Oct. 18, 2018

(65) Prior Publication Data
US 2019/0317874 A1    Oct. 17, 2019

(30) Foreign Application Priority Data
Apr. 10, 2017   (JP) .............................. JP2017-077753

(51) Int. Cl.
*G06F 11/34*       (2006.01)
*H04W 4/029*      (2018.01)
*G06F 11/30*       (2006.01)

(52) U.S. Cl.
CPC ........ *G06F 11/3438* (2013.01); *G06F 11/302* (2013.01); *H04W 4/029* (2018.02)

(58) Field of Classification Search
None
See application file for complete search history.

(56) References Cited

U.S. PATENT DOCUMENTS

2008/0263024 A1*  10/2008  Landschaft ......... G06F 16/9537
2011/0201358 A1*   8/2011  Karaoguz ............... H04W 4/20
                                                                 455/456.3
(Continued)

FOREIGN PATENT DOCUMENTS

JP       2013-228820 A     11/2013
JP       2015-87963         5/2015

OTHER PUBLICATIONS

International Preliminary Report on Patentability and Written Opinion dated Oct. 24, 2019 in PCT/JP2018/015102 (English Translation only), 6 pages.

(Continued)

*Primary Examiner* — Natisha D Cox
(74) *Attorney, Agent, or Firm* — Oblon, McClelland, Maier & Neustadt, L.L.P.

(57) ABSTRACT

An application usage estimation device includes: a rule DB serving as a rule holding unit configured to hold an application usage estimation rule for estimating, based on location information, whether a specific application is used; and an application usage estimation unit configured to acquire the location information from a user terminal and to estimate, based on the application usage estimation rule held in the rule DB, whether the specific application is used in the user terminal.

4 Claims, 7 Drawing Sheets

(56) References Cited

U.S. PATENT DOCUMENTS

| | | | |
|---|---|---|---|
| 2012/0272194 A1* | 10/2012 | Yang ................. | G06F 3/0346 |
| | | | 715/863 |
| 2013/0339345 A1* | 12/2013 | Soto Matamala .... | H04W 4/021 |
| | | | 707/722 |
| 2015/0073709 A1* | 3/2015 | Huang ................ | H04W 4/024 |
| | | | 701/537 |
| 2015/0347437 A1* | 12/2015 | Marti ................ | G06Q 30/0282 |
| | | | 707/731 |

OTHER PUBLICATIONS

Office Action dated Sep. 29,2020 in Japanese Application No. 2019-512529 (w/computer-generated English translation).

* cited by examiner

| USER | POI ID | VISIT DATE |
|---|---|---|
| A | 0001 | 2016/8/1 10:00:00 |
| A | 0003 | 2016/8/2 17:00:00 |
| A | 0001 | 2016/8/3 09:00:00 |
| A | 0005 | 2016/8/3 13:00:00 |

*Fig.5*

| POI ID | POI NAME | APPLICATION 1 | SCORE |
|---|---|---|---|
| 0001 | UENO IMPERIAL GIFT PARK | POSITION GAME A | 0.4 |
| 0002 | OSAKA CASTLE | POSITION GAME A | 0.1 |
| 0003 | IMPERIAL RESIDENCE | POSITION GAME A | 0.01 |
| 0004 | TOKYO DOME | POSITION GAME A | 0.01 |
| 0005 | SHINJUKU GYOEN NATIONAL GARDEN | POSITION GAME A | 0.3 |

Fig.6

| POI ID | POI NAME | CATEGORY 1 | CATEGORY 2 | CATEGORY 3 |
|---|---|---|---|---|
| 0001 | UENO IMPERIAL GIFT PARK | PARK | | |
| 0002 | OSAKA CASTLE | CASTLE | HISTORIC SITE | |
| 0003 | IMPERIAL RESIDENCE | PALACE | HISTORIC SITE | CASTLE |

Fig.7

APPLICATION USAGE ESTIMATION DEVICE AND RULE FORMULATION DEVICE

TECHNICAL FIELD

The present invention relates to an application usage estimation device and a rule formulation device.

BACKGROUND ART

A communication terminal such as a smartphone used by a user is called a user terminal. Conventionally, the user has extended the functions of the communication terminal by installing the application in the user terminal to use the extended functions. Therefore, for example, by acquiring information on application usage in the user terminal, it is possible to grasp the behavioral characteristics or the like of the user. Accordingly, information highly relevant to the user can be presented to the user (see, for example, Patent Literature 1).

CITATION LIST

Patent Literature

[Patent Literature 1] Japanese Unexamined Patent Publication No. 2013-228820

SUMMARY OF INVENTION

Technical Problem

However, from the viewpoint of privacy, there is a case in which the user does not allow to provide information on the application usage by the user in the user terminal. Accordingly, it is conceivable that the information on the application usage by the user cannot be acquired.

The present invention has been made in view of the above, and an object of the present invention is to provide an application usage estimation device capable of estimating application usage for each user terminal and a rule formulation device for formulating a rule used for estimating the application usage.

Solution to Problem

In order to achieve the above object, the application usage estimation device according to an embodiment of the present invention includes: a rule holding unit configured to hold an application usage estimation rule for estimating whether a specific application is used based on location information, and an application usage estimation unit configured to acquire the location information from a user terminal and to estimate whether the specific application is used in the user terminal based on the application usage estimation rule held in the rule holding unit.

Furthermore, the rule formulation device according to an embodiment of the present invention includes: an application usage information acquisition unit configured to acquire information on a user terminal that uses a specific application, a location information acquisition unit configured to acquire location information of the user terminal specified based on the information acquired by the application usage information acquisition unit, and a rule formulation unit configured to formulate, based on the location information of the user terminal acquired by the location information acquisition unit, an application usage estimation rule for estimating, in accordance with the location information, whether the specific application is used.

Advantageous Effects of Invention

With the present invention, an application usage estimation device capable of estimating application usage for each user terminal and a rule formulation device for formulating a rule used for estimating the application usage can be provided.

DESCRIPTION OF EMBODIMENTS

Hereinafter, embodiments for carrying out the present invention will be described in detail with reference to the accompanying drawings. In the description of the drawings, the same elements are denoted by the same reference numerals, and redundant explanations are omitted.

(Application Usage Estimation Device)

Figure 1:
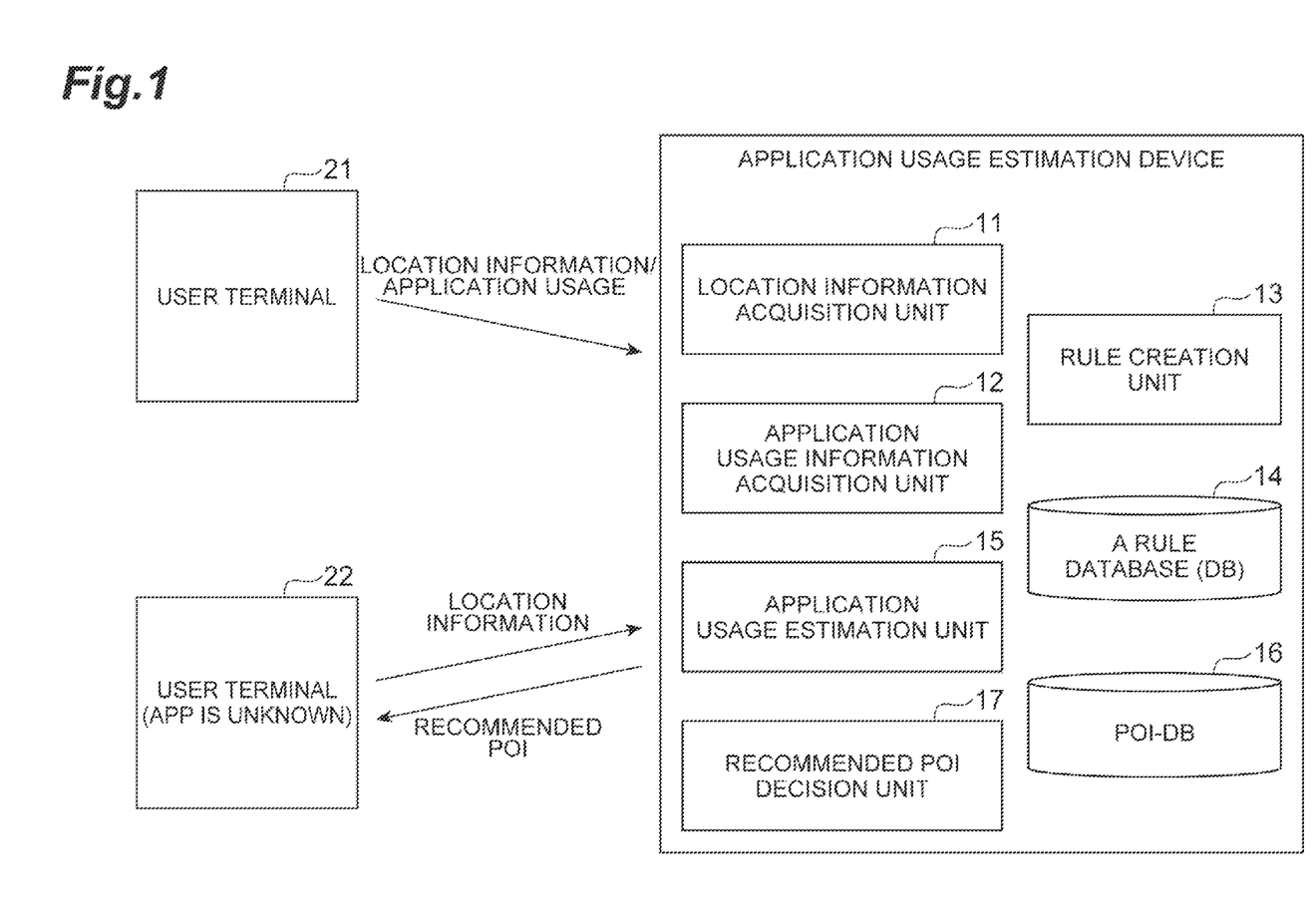
FIG. 1 is a schematic diagram of an application usage estimation device according to an embodiment of the present invention.

FIG. 1 is a schematic diagram of an application usage estimation device according to an embodiment of the present invention. The application usage estimation device 1 illustrated in FIG. 1 is a device for estimating whether a specific application is used in a user terminal of a user based on location information indicating the location of the user. In addition, the application usage estimation device 1 also has a function of formulating a rule for estimating whether an application is used in the user terminal. That is, the application usage estimation device 1 has the function of the rule formulation device. Furthermore, the application usage estimation device 1 has a function of presenting a point of interest (POI) that the user may possibly be interested in depending on an application used by the user, based on the estimation result on whether the application is used.

User terminals 21 and 22 are devices carried and used by users. Specifically, the user terminals 21 and 22 correspond to communication terminals such as mobile phones and smart phones. The user terminals 21 and 22 have functions of connecting to a wireless network such as a mobile communication network and performing wireless communication. The user terminals 21 and 22 and the application usage estimation device 1 can communicate through a wireless network, and can transmit and receive information with each other. The user terminals 21 and 22 and the application usage estimation device 1 may also transmit and receive information through a network, for example, the internet, instead of a wireless network.

In the present embodiment, the user terminal 21 has a function of transmitting, to the application usage estimation device 1, location information and application usage information regarding a use history of an application in the user terminal. In the case described below, the application usage estimation device 1 formulates, based on the location information and the application usage information transmitted from the same terminal, for example, the user terminal 21, an application usage estimation rule for estimating a use status of an application depending on the location information.

In the case described below, the user terminal 22 also has a function of transmitting the location information to the application usage estimation device 1. The application usage estimation device 1 estimates whether an application is used in the user terminal 22 that has transmitted the location information, and then, the application usage estimation device 1 provides the user terminal 22 with a POI to be recommended using the estimation result.

Note that the application usage estimation device 1 may omit the function of formulating a rule for estimating a use status of an application based on the location information and the application usage information transmitted from the same terminal. In that case, the application usage estimation device 1 estimates whether the application is used based on the application usage estimation rule after obtaining the formulated rule from an external source.

As illustrated in FIG. 1, the application usage estimation device 1 includes a location information acquisition unit 11, an application usage information acquisition unit 12, a rule formulation unit 13, a rule database (DB) 14, an application usage estimation unit 15, a POI-DB 16, and a recommended POI decision unit (visit-place information presentation unit) 17.

The location information acquisition unit 11 has a function of acquiring the location information transmitted from the user terminal 21 so that the application usage estimation rule is formulated. The location information transmitted from the user terminal 21 includes information specifying, in association with the location information, the date and time on which the user terminal 21 stayed at the location specified by the location information. In addition, the location information acquisition unit 11 has a function of acquiring the location information transmitted from the user terminal 22 that is a target for which the use status of an application is estimated using location information. Also the location information transmitted from the user terminal 22 includes information specifying, in association with the location information, the date and time on which the user terminal 22 stayed at the location specified by the location information.

The application usage information acquisition unit 12 has a function of acquiring the application usage information transmitted from the user terminal 21 so that a rule for estimating the use status of an application is formulated using the location information.

The rule formulation unit 13 has a function of formulating the application usage estimation rule based on the information acquired by the location information acquisition unit 11 and the application usage information acquisition unit 12. The method of formulating the application usage estimation rule will be described later.

The rule DB 14 has a function of storing the application usage estimation rule formulated by the rule formulation unit 13.

The application usage estimation unit 15 has a function of estimating the use status of an application in the user terminal 22, being a terminal in which the use status of the application is unknown, based on the location information transmitted from the user terminal 22. The application usage estimation unit 15 performs estimation on the application usage based on the application usage estimation rule stored in rule DB 14.

The POI-DB 16 stores information on POIs to be recommended to the user terminal 22. The information stored in the POI-DB 16 includes information indicating the correspondence relationship between an application and each POI.

The recommended POI decision unit 17 has a function of determining the POI to be recommended to the user terminal 22 based on the estimation result on the application usage made by the application usage estimation unit 15 and the information stored in the POI-DB 16. The POI to be recommended (recommended POI) is a POI that seems to be highly relevant to the user who owns the user terminal 22. In the present embodiment, the recommended POI is determined using the estimation result on the application usage.

(Method of Formulating Application Usage Estimation Rule)

Figure 2:
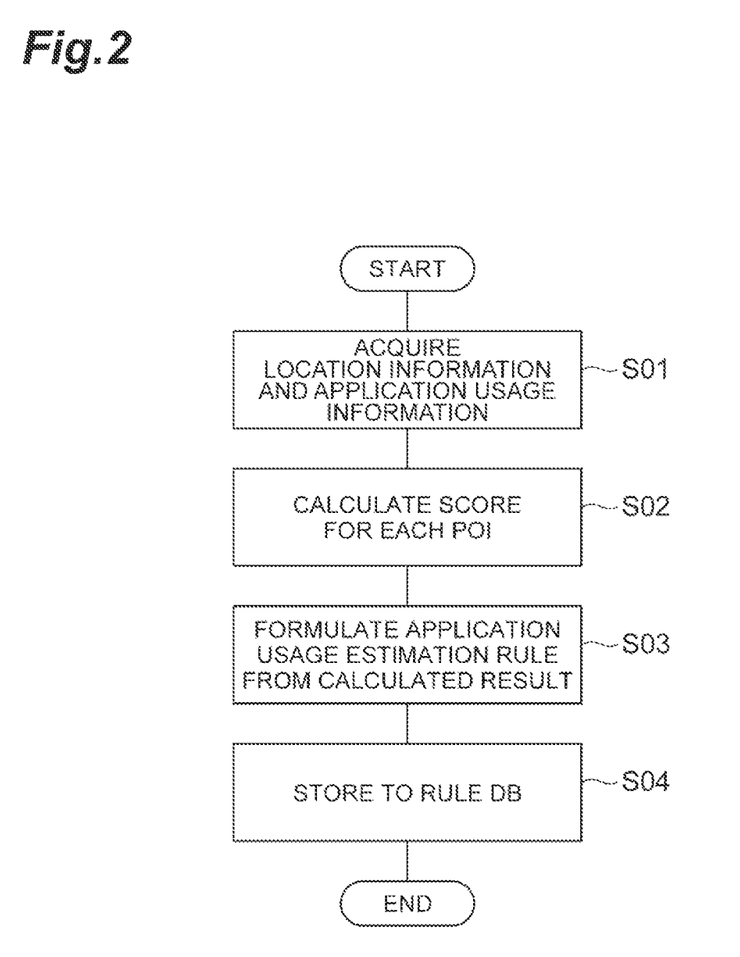
FIG. 2 is a flowchart illustrating a method of formulating an application usage estimation rule.

Next, with reference to FIG. 2, a process of formulating the application usage estimation rule performed by the application usage estimation device 1 will be described. FIG. 2 is a flowchart illustrating a method of formulating an application usage estimation rule.

As illustrated in FIG. 2, first, the location information and the application usage information are acquired from the user terminal 21 (S01). The location information acquisition unit 11 obtains the location information from the user terminal 21 and the application usage information acquisition unit 12 obtains the application usage information from the user terminal 21. Note that, at this stage, another configuration is possible to obtain pieces of location information and application usage information from the plurality of user terminals. The aforementioned information is acquired from the user terminals, and thus the number of data to be acquired increases. Accordingly, it is possible to formulate a rule based on correspondence between an application and the location information, not a rule based on behavior characteristics of each user.

Figure 4:
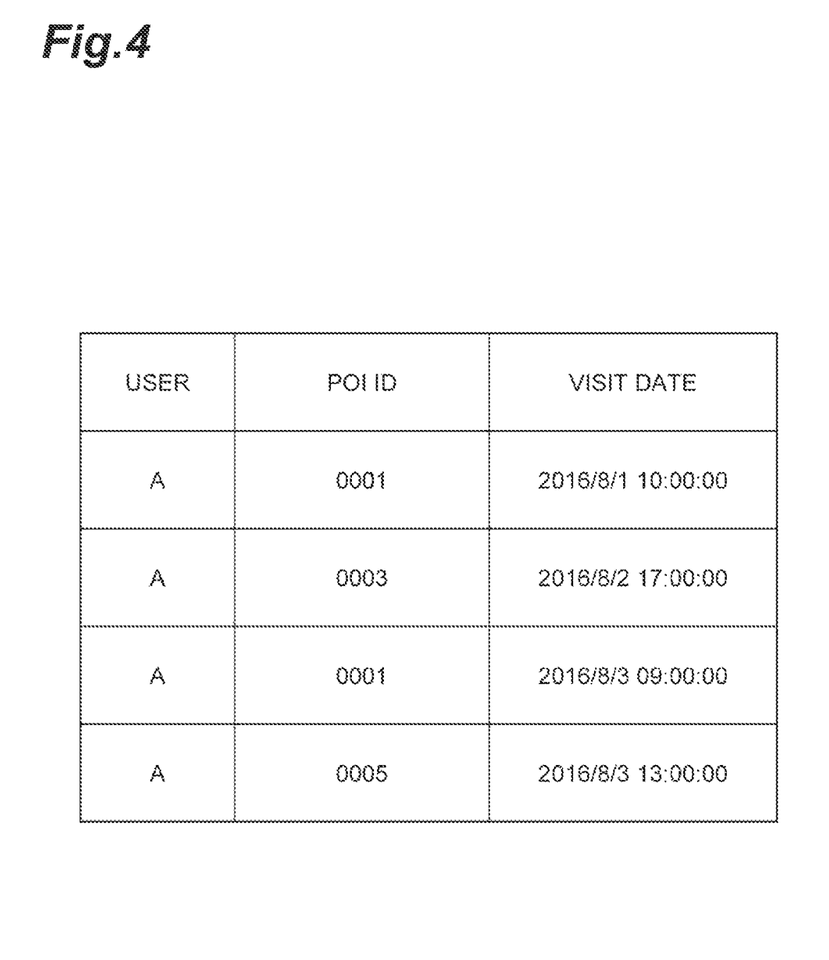
FIG. 4 is a diagram illustrating an example of location information acquired from the user terminal by a location information acquisition unit.

An example of location information acquired from the user terminal 21 by the location information acquisition unit 11 is illustrated in FIG. 4. As illustrated in FIG. 4, information associated with information identifying a user (here, "A" as a user ID), an ID of a POI corresponding to the location information, and a date and time when the POI was visited is acquired from the user terminal 21. The application usage estimation device 1 according to the present embodiment assumes that, for example, a user holding a user terminal in which an application for recording the running history has been installed will go to a predetermined running course for the purpose of running. Likewise, the application usage estimation device 1 assumes that a user using a specific application will go to a predetermined place for some purpose related to the application, and collects the location information. Accordingly, the accuracy of the location information is required to be accuracy of merely specifying whether the user terminal has gone to a specific POI. Therefore, for example, a check-in history to the specific POI can be used as the location information. However, further detailed analysis of the location information may be performed by collecting location information with higher accuracy.

The application usage information acquired from the user terminal 21 by the application usage information acquisition unit 12 may be information indicating whether an application is used in the user terminal 21 within a predetermined period. More specifically, information specifying the date and time when the application was used may be collected. In that case, it is also possible to use the correspondence relationship between the date and time when the application was used and the date and time when the location information was acquired (the date and time when the user terminal 21 stayed at the place identified by the location information) for formulating a rule.

The location information and the application usage information related to the user terminal 21 can be acquired through any medium, instead of direct acquisition from the user terminal 21. For example, when a specific application is used in the user terminal 21, there is a case in which information indicating the application usage and information indicating a visit place (location information) are combined and posted to a social networking service (SNS). Accordingly, the application usage estimation device 1 may be configured to acquire the location information and the application usage information from the information posted on the SNS or the like.

Next, the rule formulation unit 13 of the application usage estimation device 1 calculates a score related to an application for each POI (S02). This score is a value indicating the strength of the relationship between the POI and the application, and is calculated for each POI and each application. Although the method of calculating the score is not particularly limited, one specific example will be described below.

First, the following lift value L is calculated for each POI by Formula (1) below:

[Mathematical 1]

$$L = \frac{|X \cap Y|}{|X|} \bigg/ \frac{|Y|}{|N|} \quad (1)$$

where, in Formula (1) mentioned above, X is the number of users who used a specific application (the number of user terminals), Y is the number of users who visited a specific POI, and N is the number of users who obtained the location information and the application usage information. That is, the lift value L mentioned above enables the calculation of the ratio of the users who used a specific application to the users who visited a specific POI. Then, a normalized value using the maximum value of the lift value for each application calculated in each POI is calculated as a relation score $S_C$.

Next, when the association between an application and a specific POI is presented for each application, this information is calculated as an in-application score $S_A$. For example, when a notice that some information or item etc. is distributed at a specific POI is indicated in the application, the POI is highly relevant to the application, for the user of the application. Accordingly, the in-application score $S_A$ is used as the value indicating the degree of correspondence with the POI defined by the application itself.

Furthermore, as described above, in the case in which a post combining the information indicating the application usage and the information indicating a visit place (location information) is acquired from an SNS, a posting score $S_T$ is calculated based on the number of the posts. The contents posted to the SNS includes the information corresponding to the POI and the information indicating the application usage, and therefore, it is considered clear that the application was used in the POI. Accordingly, the posting score $S_T$ may be calculated separately from the relation score $S_C$. In this case, posts are counted for each combination of a POI and an application, and then the number of posts is normalized with the maximum value thereof, whereby the posting score $S_T$ for each POI and each application can be calculated.

After calculating the relation score $S_C$, the in-application score $S_A$, and the posting score $S_T$, the score S for each POI and each application can be calculated on the basis of the aforementioned scores by Formula (2). Note that α and β can be arbitrarily set.

$$\text{score } S = \alpha S_C + \beta S_A + (1-\alpha-\beta) S_T \quad (2)$$

Figure 5:
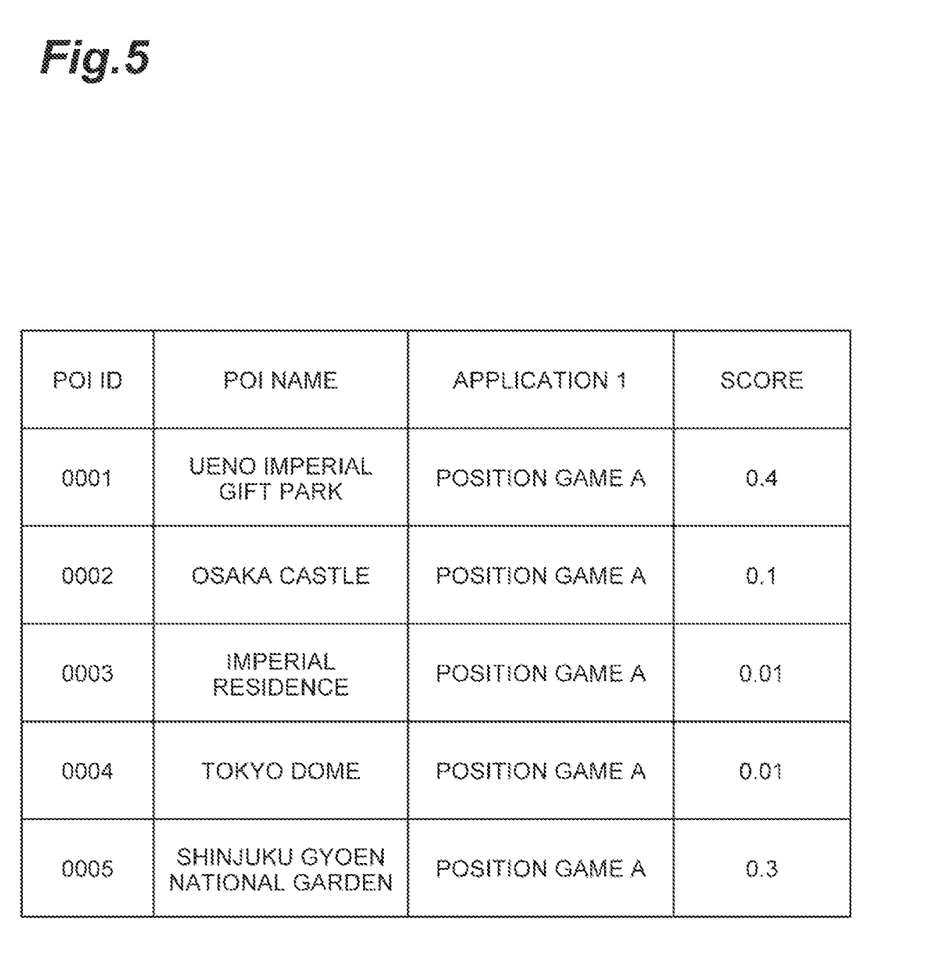
FIG. 5 is a diagram illustrating an example of scores S in association with each POI and each application.

An example of the scores S in association with each POI and each application is illustrated in FIG. 5. The score S calculated for each POI and each application in this manner is information indicating the strength of the relationship between the application and the location information.

Return to FIG. 2. Next, the rule formulation unit 13 formulates the application usage estimation rule based on the calculation result of the score (S03). The application usage estimation rule can be arbitrarily formulated using the above score. One specific example of the application usage estimation rule will be described below.

For example, a visit history to the POI (information indicating that the user terminal has checked in to the POI) within a predetermined period (for example, the past three days) is acquired from the user terminal that is a target for estimating whether an application is used. Then, among the scores S of a specific application that have been calculated for each POI, the scores S corresponding to the POIs included in the visit history of the user terminal are summed to obtain a total. If the result of summation is larger than a predetermined threshold, the user terminal is determined as the user of the specific application. Such a rule can be defined as stated above.

In this manner, the rule formulation unit 13 formulates the application usage estimation rule using the score S calculated for each POI and each application. The correspondence relationship between an application and the movement of the user terminal is considered to be different for each application, and thus the threshold which is the reference in the application usage estimation rule can be set for each application. When the scores S for each POI included in the visit history of the user terminal are summed, for example, weighting for each time zone can be involved. In this manner, it is possible to add modification or the like as appropriate to the formulation of application usage estimation rule.

Thereafter, the application usage estimation rule formulated by the rule formulation unit 13 is stored in the rule DB 14 (S04). The application usage estimation rule is formulated for each application, and thus the plurality of application usage estimation rules are stored in rule DB 14. When the score S for each POI and each application is used in the application usage estimation rule, similar to the aforementioned rule, the information on the score S is stored in the rule DB 14 together with the application usage estimation rule. The application usage estimation rule is prepared in this manner, and thus the application usage in the user terminal can be estimated.

In the case described above, the rule formulation unit 13 calculates the score S for each POI and each application based on the location information and the application usage information obtained from the user terminal 21, and formulates the application usage estimation rule using the score S. However, after acquiring the location information and the application usage information from the user terminal 21 (S01), the rule formulation unit 13 may formulate the application usage estimation rule using machine learning.

In the case of using machine learning for estimating whether a specific application is used, first, a feature value for distinguishing between a user of a specific application and a non-user is set, and a feature space capable of distinguishing between the user and the non-user is set with the feature value. This feature space becomes the application usage estimation rule.

It is conceivable that examples of the feature value used for the feature space include a visit history for each visit place (POI) within a predetermined period (for example, past three days), a time zone containing a visit to (check in) the POI, and the total numbers of visits to the POI. When the number of visit places (POI) is large, for example, the number of POIs may be aggregated for each score S by using the score S described in the above procedure to set the feature value. In this manner, the setting of the feature value can be modified as appropriate. Feature values and the like used when machine learning is used can be appropriately selected based on the provided location information or the like of the user terminal. Depending on the characteristics of an application, the visit history for each time zone may be useless.

(Method of Estimating Application Usage Based on Location information and Method of Recommending POI)

Figure 3:
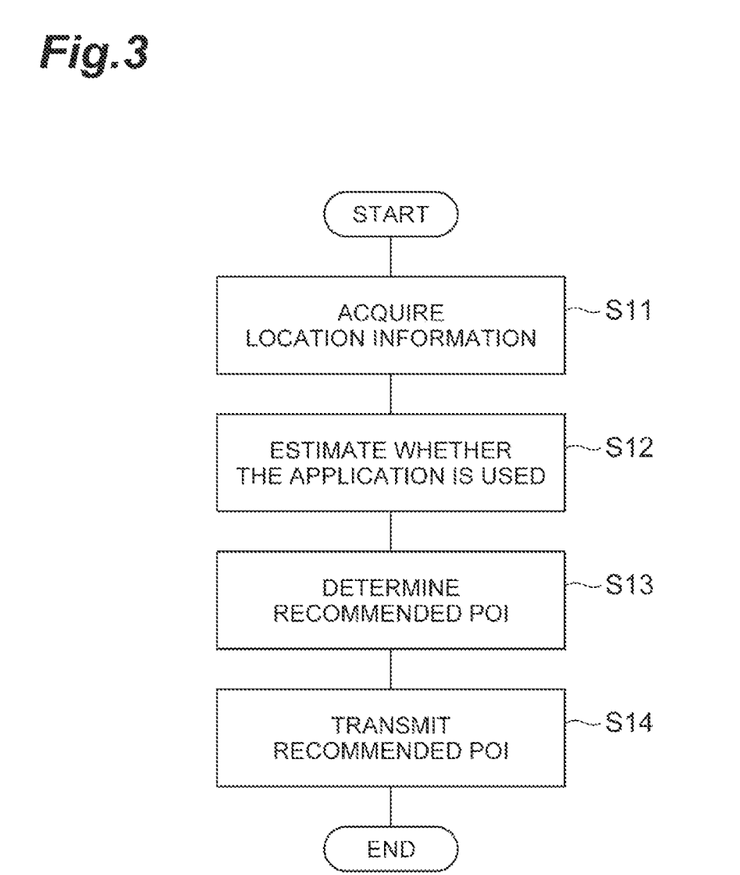
FIG. 3 is a flowchart illustrating a method of estimating the application usage of a user terminal and a method of recommending a POI.

Next, with reference to FIG. 3, a process of formulating the application usage estimation rule performed by the application usage estimation device 1 will be described. FIG. 3 is a flowchart illustrating a method of estimating the use of application relating to the user terminal 22 and a method of recommending a POI.

First, the location information is obtained from the user terminal 22 that is a target to which the recommended POI is presented (S11). The location information acquisition unit 11 acquires the location information from the user terminal 22. The location information acquired from the user terminal 22 is not a single piece. The user terminal 22 acquires predetermined amount of data (for example, a time zone, and the number of pieces of data) set based on the application usage estimation rule that has been prepared in advance.

Next, the application usage estimation unit 15 of the application usage estimation device 1 estimates whether the user terminal 22 has used a specific application (S12). Specifically, the application usage estimation rule for an application to be subjected to estimation of whether the application is used is obtained, and based on the rule written in the rule DB 14, whether the application is used is estimated.

Figure 6:
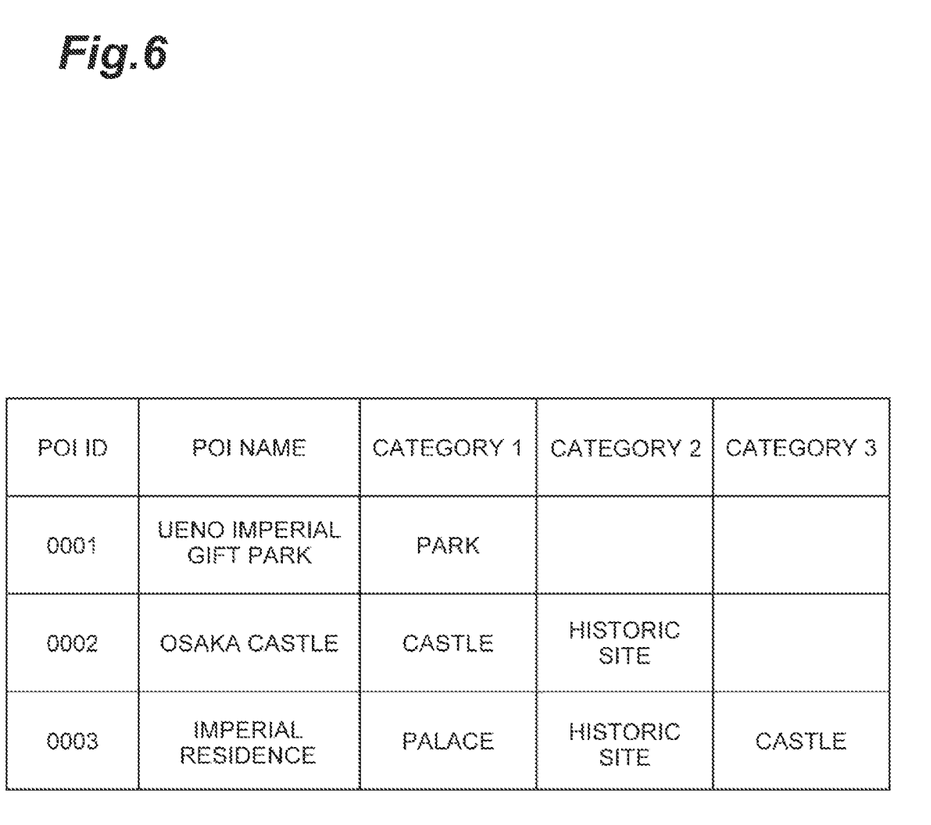
FIG. 6 is a diagram illustrating an example in which information indicating POI categories (attributes of each POI) is stored in association with each POI.

Next, the recommended POI decision unit 17 determines the recommended POI to be presented to the user terminal 22 using the estimation result on whether the application is used made by the application usage estimation device 1 (S13). As described above, the users who use the same application may visit the same POI. Accordingly, when the recommended POI is determined, location information (history of visited POI) of a user terminal using the same application or a user terminal presumed to be using the same application is used for determining the recommended POI to the user terminal 22. The recommended POI decision unit 17 selects a recommended POI from the candidates of the recommended POIs stored in the POI-DB 16. As illustrated in FIG. 6, the POI-DB 16 may store information indicating the category of the POI (attribute of each POI) in association with the ID of the POI. However, in the present embodiment, a recommended POI is determined according to whether an application is used in the user terminal 22, instead of the category of the POI.

Although the method of determining the recommended POI is not particularly limited, a method of determining the recommended POI in consideration of the score S for each POI and each application at the time of formulating application usage estimation rule is introduced as one of techniques. For example, when a specific application has been estimated to be used in the user terminal 22, a POI with a high score S related to the application is possibly useful for the user of the user terminal 22. Accordingly, there is a method of determining a POI with a high score S as the recommended POI. Even though the score S is high, the recommended POI cannot be an actual destination for the user terminal 22 when the distance from the user terminal 22 to the recommended POI is large. Accordingly, the score S may be combined with the latest location information of the user terminal 22 to determine the recommended POI. Specifically, for example, a method of calculating a recommendation score by Formula (3) below and determining the recommended POI based on the recommendation score is introduced. In Formula (3), $\alpha$ is a coefficient used for weighting.

$$\text{recommendation score} = \alpha \times \text{score } S + (1-\alpha) \times \text{distance to POI} \quad (3)$$

Alternatively, without using the score S, the recommended POI can be determined using a known technique or the like. For example, a method of proposing a POI to newly visit based on the visit history of past visits to POIs has already been studied ("Time-aware Point-of-interest Recommendation", Quan Yuan, Gao Cong, Zongyang Ma, Aixin Sun, Nadia Magnenat-Thalmann. SIGIR'13 Proceedings of the 36th International ACM SIGIR conference on Research and development in information retrieval, Pages 363-372). In the aforementioned research, based on the following hypothesis that "a place near the user is easy to visit, a place that is easy for a user to visit changes with the time zone, and users who visited the same place are possibly visit the same place in the future (user-based collaborative filtering)", a recommendation score indicating whether a POI is proper to be recommended is calculated for each POI. In addition, the aforementioned research discloses that the POI is presented as a candidate for a new visit place based on the recommendation score. When applying this research to the determination of a recommended POI according to the present embodiment, by combining the above hypothesis with another hypothesis that "users who use the same application are likely to visit the same place in the future", it is conceivable that if the candidate for a new visit place is determined, the selection accuracy increases, in other words, a POI that matches the user needs more can be recommended.

In the aforementioned research, a matrix of the behavior of the user for each time zone is formulated and the similarity is evaluated in the user-based collaborative filtering. At this time, a process of smoothing the degree of similarity for each time zone is performed. When the recommended POI according to the present embodiment is determined, smoothing of the similarity may be performed by incorporating requirements according to the characteristics of an application at the time of smoothing. For example, there may be information that the user of a specific application visited the POI "A" tends to visit the POI "B" due to the characteristics of the application. In that case, it is conceivable that, at the time of smoothing, the processing is performed so that the relevance between the POI "A" and the POI "B" becomes high. Thus, when the aforementioned research is used, a recommended POI can be determined based on the hypothesis that "users who use the same application have high relevancy to the visited POI".

In this manner, the analysis using the aforementioned technique is performed using the location information of a user terminal using the same application or a user terminal presumed to be using the same application, and thereby the recommended POI can be determined.

Thereafter, the information on the recommended POI determined by the recommended POI decision unit 17 is transmitted to the user terminal 22 (S14). In this manner, the information on the recommended POI is received by the user terminal 22, so that the user can confirm the recommended POI.

Note that, when there are a plurality of applications estimated to be used in the user terminal 22, it is conceivable that the recommended POI decision unit 17 determines a recommended POI based on each of the plurality of applications presumed to be used in the user terminal 22, using the above technique, and presents the recommended POIs to the user terminal 22.

Also, when the recommended POI is determined by using the aforementioned research, it is conceivable that a method of determining the recommended POI by summing the recommendation scores calculated for each POI and each application is available. Furthermore, it is conceivable that, when the recommendation score is calculated, the aforementioned score S is combined to give different weights to each POI and each application, and that the total of the recommendation scores is calculated in consideration of the weights. Specifically, for example, the recommendation score can be calculated by Formula (4) below:

[Mathematical 2]

$$\text{recommendation\_score} = \sum_{app} \sum_{poi} w_{app} S_{app,poi} \quad (4)$$

where, in Formula (4) mentioned above, $W_{app}$ indicates a weight for each application, and $S_{app,poi}$ indicates a score S for each application and each POI.

As described above, the application usage estimation device 1 according to the present embodiment includes: the rule DB 14 serving as a rule holding unit configured to hold an application usage estimation rule for estimating whether a specific application is used based on the location information, and the application usage estimation unit 15 configured to acquire the location information from the user terminal 22 and to estimate whether the specific application is used in the user terminal 22 based on the application usage estimation rule held in the rule DB 14.

In the aforementioned application usage estimation device 1, the location information transmitted from the user terminal 22 is acquired, and whether a specific application is used in the user terminal 22 is estimated based on the application usage estimation rule.

Conventionally, it has been studied to grasp the behavioral characteristics of users and provide each user with appropriate information. In this regard, for example, it is conceivable that a person having a specific hobby is likely to install applications related to the hobby in the user terminal. Accordingly, it is conceivable that the behavioral characteristics of users can be grasped from the use status of an application in the user terminal. Therefore, it is conceivable to acquire the use status of the application in the user terminal, and provide appropriate information for each user based on this information. However, from the viewpoint of privacy or the like, there is a case in which it is difficult to collect the use status of applications in the user terminal. That is, although there is a need to grasp the use status of an application, there is a case in which it is impossible to acquire the information on the use status of the application itself.

By contrast, with the application usage estimation device 1 according to the present embodiment, it is possible to estimate whether a specific application is used based on the location information of user terminal. Accordingly, it is possible to estimate whether an application is used even though the information on the use status of the application itself cannot be acquired. In addition, it is possible to estimate whether the application is used without using the information on the use status of the application itself, and therefore, it is possible to reduce a communication load necessary for collecting the use status of an application and reduce a capacity of the device for holding the information.

In one aspect, the application usage estimation rule may be a rule for estimating whether a specific application is used based on the location information within a predetermined period, and one aspect of the location information transmitted from the user terminal 22 may be location information within a predetermined period.

As described above, by using the application usage estimation rule based on the location information within a predetermined period to estimate whether a specific application is used in the user terminal, it is possible to more appropriately estimate whether the application is used based on the activities of the user possessing the user terminal in the predetermined period. In addition, the information acquired by the user terminal can be used as the location information of the user terminal within a predetermined period, the load generated in the user terminal can be reduced.

In one aspect, the application usage estimation rule may be set by using a score that is a value indicating the strength of the relationship between a POI that is a visit place specified by the location information and an application, and the application usage estimation unit 15 may estimate whether a specific application is used in the user terminal by using a score related to a visit place specified by the location information acquired from the user terminal 22.

It is conceivable that, as the location information transmitted from the user terminal, location information having a strong relationship with the application and location information having a weak relationship with the application are included. Accordingly, as described above, by estimating whether an application is used using the score which is the value indicating the strength of the relationship between the POI and the application, the estimation accuracy increases. In addition, as the estimation accuracy increases, the possibility of re-estimating whether an application is used is reduced, and thus the load generated in the user terminal can be reduced.

In one aspect, the application usage estimation unit 15 may further include the recommended POI decision unit 17 serving as a visit-place information presentation unit configured to present information on new visit place to the user terminal 22 when it is estimated that the specific application is used in the user terminal 22. As described above, in the case in which it is estimated that an application is used, by presenting the information of the visit place that is related to the application, information that seems related to a user based on the estimation result on whether the application is used can be provided to the user terminal. With such a configuration, the possibility that the user searches for information related to the application by operating the user terminal is reduced and also the number of searches itself can be reduced, and therefore the load of traffic can be reduced.

In one aspect, the recommended POI decision unit 17 may determine information on a new visit place to be provided to the user terminal 22 by using the location information of a user terminal 22 using the specific application or a user terminal 22 presumed to be using the specific application.

As described above, by determining information on a new visit place by using the location information of a user terminal 22 using the specific application or the location information of a user terminal 22 presumed to be using the specific application, information that seems to have stronger relationship with the user can be provided based on the behavior of users who use the same application or the like. With such a configuration, the possibility that the user searches for information related to the application by operating the user terminal is reduced and also the number of searches itself can be reduced, and therefore the load of traffic can be reduced.

The application usage estimation device 1 serving as the rule formulation device according to the present embodiment includes: the application usage information acquisition unit 12 configured to acquire information on the user terminal 21 that uses a specific application; the location information acquisition unit 11 configured to acquire the location information of the user terminal 21 specified based on the information acquired by the application usage information acquisition unit 12; and the rule formulation unit 13 configured to formulate, based on the location information of the user terminal 21 acquired by the location information acquisition unit 11, the application usage estimation rule for estimating, in accordance with the location information, whether the specific application is used.

With the application usage estimation device 1 serving as the rule formulation device according to the present embodiment, it is possible to formulate the application usage estimation rule for estimating whether a specific application is used based on the location information provided from the user terminal using the specific application. Accordingly, it is possible to formulate an application usage estimation rule for estimating whether an application is used even though the information on the use status of the application itself cannot be acquired. In addition, by formulating the application usage estimation rule, whether an application is used can be estimated. Thus, it is possible to estimate whether the application is used without using the information on the use status of the application itself, and therefore, a communication load necessary for collecting the use status of an application and a capacity of the device for holding the information can be reduced.

In one aspect, the rule formulation unit 13 calculates a score S, which is a value indicating the strength of the relationship between the visit place and the application of the user terminal 21, based on the location information of the user terminal 21, for each visit place, and may set the score S to formulate the application usage estimation rule.

It is conceivable that, as the location information transmitted from the user terminal, location information having a strong relationship with the application and location information having a weak relationship with the application are included. Accordingly, as described above, when a score that is a value indicating the strength of the relationship between a visit place and an application is calculated and the application usage estimation rule is formulated using this score, the estimation accuracy is enhanced. In addition, as the estimation accuracy increases, the possibility of re-estimating whether an application is used is reduced, and thus the load generated in the user terminal can be reduced.

In the aforementioned embodiment, the case where the application usage estimation device 1 serving as a rule formulation device has been described. However, the function of the rule formulation device and the function of the application usage estimation device may be provided to mutually different devices. Further more, the functions of each device may be provided to the plurality of devices in a distributed manner.

In the aforementioned embodiment, as the application usage estimation rule, a rule taking into account the score S, and another rule formulated by using the machine learning have been described, but the application usage estimation rule may be formulated in a different procedure from the aforementioned procedures. For example, when the number of visits to a specific POI is a predetermined number of times or larger, a rule estimating that a specific application is used, in other words, the application usage estimation rule not using the score S may be used.

(Other)

The block diagram used in the description of the aforementioned embodiment illustrates the blocks of the functional units. These functional blocks (constituent parts) are implemented by arbitrary combination of hardware and/or software. Means for implementing each functional block is not particularly limited. That is, each functional block may be implemented by a single device physically and/or logically combined, or may be implemented by two or more devices that are physically and/or logically separated and are connected directly and/or indirectly (for example, in a wired and/or wireless manner).

Figure 7:
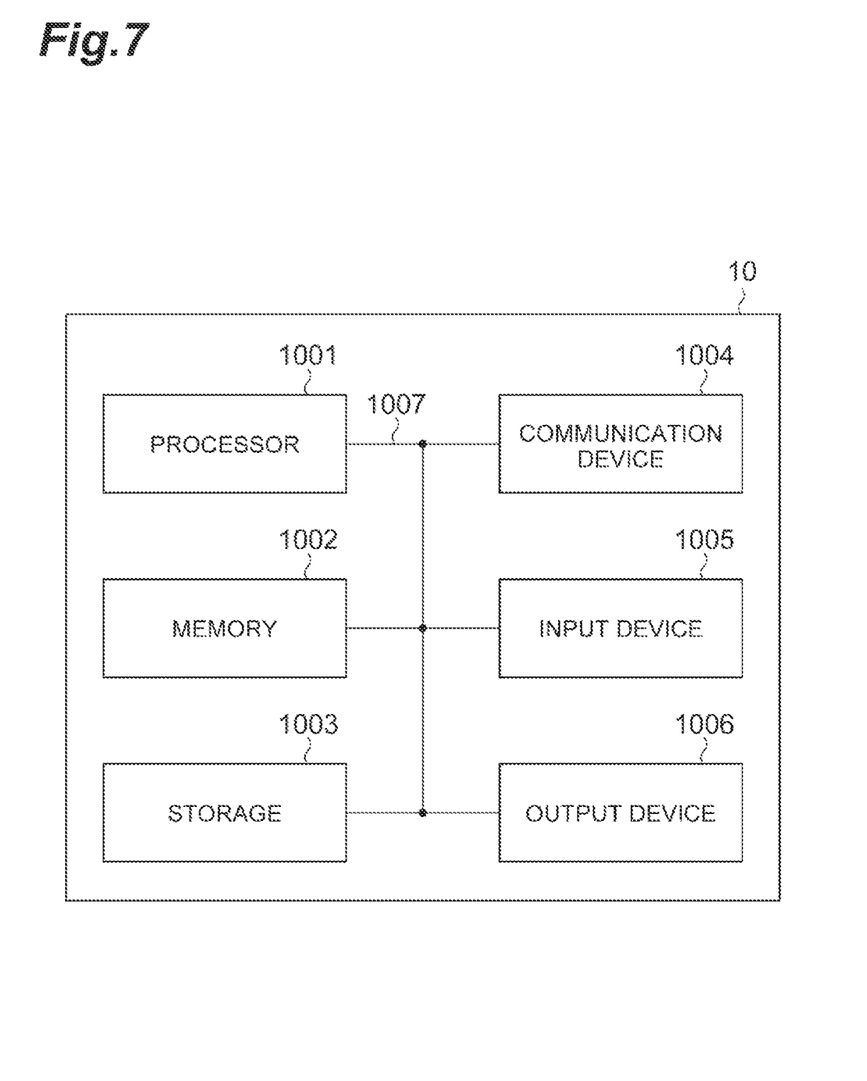
FIG. 7 is a diagram illustrating an example of a hardware configuration of an application usage estimation device according to the present embodiment.

For example, the application usage estimation device 1 according to an embodiment of the present invention may function as a computer that performs processing according to the present embodiment. FIG. 7 is a diagram illustrating an example of a hardware configuration of the application usage estimation device 1 according to the present embodiment. The aforementioned application usage estimation device 1 may be physically configured as a computer device including a processor 1001, a memory 1002, a storage 1003, a communication device 1004, an input device 1005, an output device 1006, and a bus 1007, and the like.

In the following description, the term "device" can be read as a circuit, an apparatus, a unit, and the like. The hardware configuration of the application usage estimation device 1 may include one or more of the devices illustrated in the drawings or may omit some of the devices.

When predetermined software (program) is loaded on hardware such as the processor 1001 and the memory 1002, the processor 1001 performs calculation and controls communication by the communication device 1004 and controls reading from and/or writing to the memory 1002 and the storage 1003. In this manner, each function in the application usage estimation device 1 is implemented.

The processor 1001, for example, operates an operating system to control the entire computer. The processor 1001 may include a central processing unit (CPU) including an interface with a peripheral device, a control unit, an arithmetic unit, registers, and the like. For example, the rule formulating unit 13 in the application usage estimation device 1 may be implemented by the processor 1001.

In addition, the processor 1001 executes various processes according to a program (program code), a software module, and data that have been loaded from the storage 1003 and/or the communication device 1004 to the memory 1002 by the processor 1001. As the program, programs for causing the computer to execute at least part of the operations described in the aforementioned embodiments are used. For example, the application usage estimation unit 15 of the application usage estimation device 1 may be implemented by a control program that is stored in the memory 1002 and configured to be operated on the processor 1001. Other functional blocks may be implemented in the same manner. An example in which the aforementioned various processes are executed by the single processor 1001 has been described, but the processes may be executed simultaneously or sequentially by two or more processors 1001. The processor 1001 may be implemented by at least one chip. Note that the program may be transmitted from the network through an electric communication line.

The memory 1002 is a computer-readable storage medium and, for example, may consist of at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), and the like. The memory 1002 can store a program (a program code), a software module, and the like that are executable to execute the wireless communication method according to an embodiment of the present invention.

The storage 1003 is a computer-readable storage medium and may consist of, for example, at least one of an optical disc, such as a compact disc ROM (CD-ROM), a hard disk drive, a flexible disk, a magnetic optical disc (for example, a compact disc, a digital versatile disc, and a Blu-ray (registered trademark) disc), a smart card, a flash memory (for example, a card, a stick, and a key drive), a floppy (registered trademark) disk, or a magnetic strip. The storage 1003 may be referred to as an auxiliary storage device. The aforementioned storage medium may be, for example, a database or a server including the memory 1002 and/or the storage 1003 or other appropriate media.

The communication device 1004 is hardware (a transceiver device) for communication over computers through a wired and/or a wireless network and is, for example, also referred to as a network device, a network controller, a network card, a communication module, and the like. For example, the aforementioned location information acquisition unit 11 of the application usage estimation device 1 may be implemented by the communication device 1004.

The input device 1005 is an input device for receiving external inputs (for example, a keyboard, a mouse, a microphone, a switch, a button, or a sensor). The output device 1006 is an output device for providing external outputs (for example, a display, a speaker, or an LED lamp). Note that the input device 1005 and the output device 1006 may have a unitary structure (for example, a touch panel).

Each of the devices such as the processor 1001 and the memory 1002 is connected to other devices through the bus 1007 for communicating information. The bus 1007 may consist of a single bus or different buses among the devices.

In addition, the application usage estimation device 1 may include hardware such as a microprocessor, a digital signal processor (DSP), an application specific integrated circuit (ASIC), a programmable logic device (PLD), and a field programmable gate array (FPGA). Part or all of the functional blocks may be implemented by the hardware. For example, the processor 1001 may be implemented by at least one of the pieces of hardware.

The present embodiments have been described above in detail. However, it is apparent to those skilled in the art that the present embodiments are not limited to the embodiments described in the present description. The present embodiments can be implemented as a corrected and modified mode without departing from the gist and scope of the present invention defined by the appended claims. Accordingly, the statement in the present description is made for describing examples and does not have any restrictive meaning to the present embodiment.

The aspects/embodiments described in the present description may be applied to a system using long term evolution (LTE), LTE-Advanced (LTE-A), SUPER 3G, IMT-Advanced, 4G, 5G, future radio access (FRA), W-CDMA (registered trademark), GSM (registered trademark), CDMA 2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems, and/or a next-generation systems expanded on the basis of these communication standards.

The processing procedures, sequences, flowcharts, and the like, in the aspects/embodiments described in the present description may change the order of steps, as long as there is no inconsistency. For example, for the methods described in the present description, various elements of the steps are presented in an exemplary order, and the methods disclosed herein are not limited to the presented specific order.

Information or the like that has been input thereto or output therefrom may be stored in a certain location (for example, a memory) and/or managed in a management table. Information or the like that has been input thereto or output therefrom may be overwritten and updated, or additional items may be added thereto. Information or the like that has been output therefrom may be deleted. Information or the like that has been input thereto may be transmitted to the other devices.

Determination may be made with a one-bit value (0 or 1), a Boolean value (true or false) or numerical comparison (for example, comparison with a predetermined value).

The aspects/embodiments described in the present description may be used singularly or in combinations. The aspects/embodiments may be switched in connection with the execution thereof in use. Notification of predetermined information (for example, notification of "being X") is not limited to being performed explicitly. The notification of predetermined information may be performed implicitly (for example, not notifying the predetermined information).

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, or other terms, regardless of whether the software is referred to as software, firmware, middleware, a microcode, a hardware descriptive language, or other names.

The software, the instruction, and the like may be transmitted and received through a transmission medium. For example, when the software is transmitted from a website, a server, or other remote sources using wired techniques such as a coaxial cable, an optical fiber cable, a twisted-pair cable, or a digital subscriber line (DSL), and/or wireless techniques such as infrared, radio waves, or microwaves, these wired techniques and/or wireless techniques are included in the definition of the transmission medium.

The information, the signals, and other items described in the present description may be represented with any various different techniques. For example, data, an instruction, a command, information, a signal, a bit, a symbol, and a chip which can be mentioned throughout the aforementioned description may be represented with a voltage, a current, an electromagnetic wave, a magnetic field or magnetic particles, an optical field or photons, or any combination thereof.

The terms "system" and "network" used in the present description are compatibly used.

The information, parameters, and the other items described in the present description may be represented with absolute values, relative values to a predetermined value, or other corresponding information.

The names used for the aforementioned parameters are not restrictive in any viewpoint. Furthermore, the formulae and the like using these parameters may differ from those explicitly disclosed in the present description.

Those skilled in the art may call the user terminal a mobile station a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

The terms "determining" and "deciding" used in this specification may include a wide variety of actions. For example, "determining" and "deciding" may include, for example, events in which events such as calculating, calculating, computing, processing, deriving, investigating, looking up (for example, looking up in a table, a database, or another data structure), or ascertaining are regarded as "determining" or "deciding". Furthermore, "determining" and "deciding" may include, for example, events in which events such as receiving (for example, receiving information), transmitting (for example, transmitting information), input, output, or accessing (for example, accessing data in a memory) are regarded as "determining" or "deciding". Furthermore, "determining" and "deciding" may include, for example, events in which events such as resolving, selecting, choosing, establishing, or comparing are regarded as "determining" or "deciding". In other words, "determining" and "deciding" may include events in which a certain operation is regarded as "determining" or "deciding".

The expression "based on" used in the present description does not mean "only based on", unless specifically stated otherwise. In other words, the expression "based on" means both "only based on" and "at least based on".

In the present description, it is intended to include a plurality of devices other than a case where there is only one device contextually or technically obviously.

In the whole of the present disclosure, it is intended to include the plural unless it clearly indicates the singular from the context.

REFERENCE SIGNS LIST

1 . . . application usage estimation device, 11 . . . location information acquisition unit, 12 . . . application usage information acquisition unit, 13 . . . rule formulation unit, 14 . . . rule DB, 15 . . . application usage estimation unit, 16 . . . POI-DB, 17 . . . recommended POI decision unit

The invention claimed is:

1. An application usage estimation device, comprising:
a memory configured to hold an application usage estimation rule for estimating whether a specific application is used based on location information; and
processing circuitry configured to acquire the location information from a user terminal and to estimate whether the specific application is used in the user terminal based on the application usage estimation rule held in the memory,
wherein
the processing circuitry is configured to present information on a new visit place to the user terminal when it is estimated that the specific application is used in the user terminal, and
the processing circuitry determines information on the new visit place to be provided to the user terminal by using the location information of a user terminal using the specific application or a user terminal presumed to be using the specific application.

2. The application usage estimation device according to claim 1, wherein
the application usage estimation rule is a rule for estimating whether a specific application is used based on the location information within a predetermined period, and
the location information transmitted from the user terminal is location information within a predetermined period.

3. The application usage estimation device according to claim 1, wherein
the application usage estimation rule is set by using a score that is a value indicating strength of a relationship between a visit place specified by the location information and an application, and
the processing circuitry estimates whether the specific application is used in the user terminal by using the score related to a visit place specified by the location information acquired from the user terminal.

4. A method, implemented by an application usage estimation device, comprising:
storing, in a memory, an application usage estimation rule for estimating whether a specific application is used based on location information;
acquiring, by processing circuitry, the location information from a user terminal and to estimate whether the specific application is used in the user terminal based on the application usage estimation rule held in the memory; and
presenting, by the processing circuitry, information on new visit place to the user terminal when it is estimated that the specific application is used in the user terminal, wherein the processing circuitry determines information on the new visit place to be provided to the user terminal by using the location information of a user terminal using the specific application or a user terminal presumed to be using the specific application.

* * * * *